April 2, 1963
R. A. SOMMER ETAL
3,084,323
FURNACE CONTROL CIRCUIT
Filed March 7, 1961
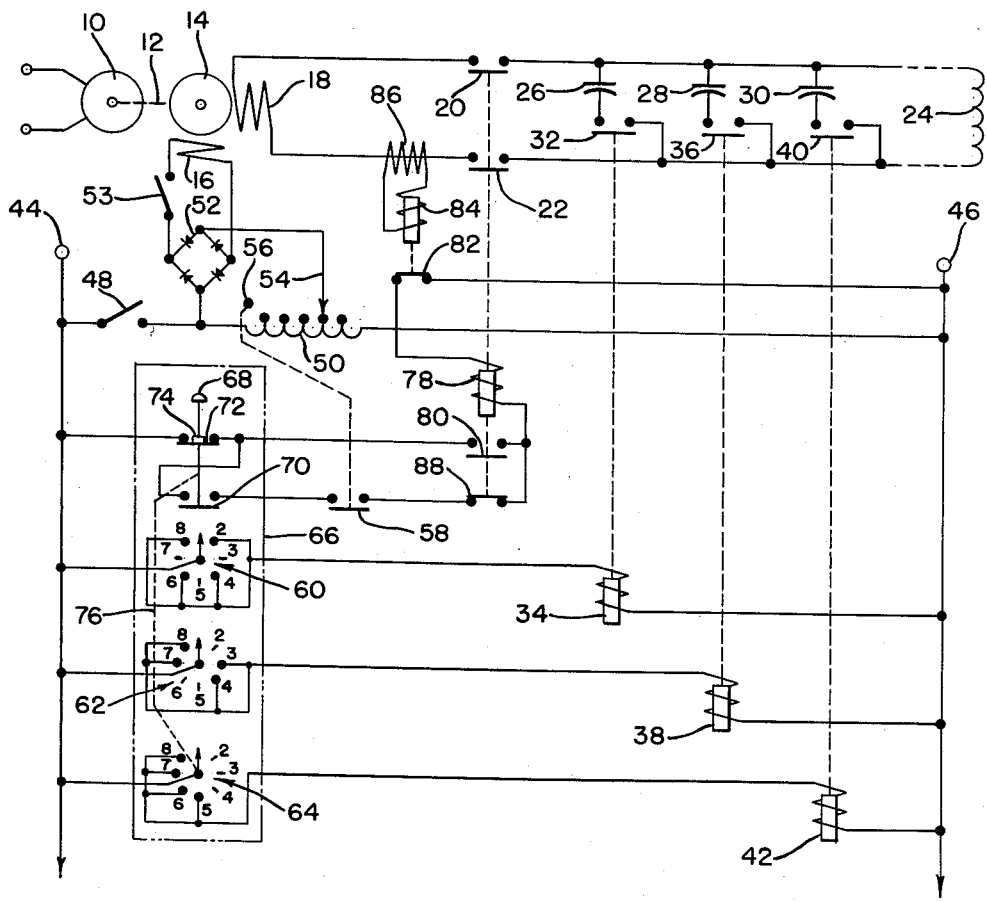
INVENTORS.
RICHARD A. SOMMER,
RICHARD F. SEYFRIED &
ROBERT J. KASPER
BY
*Alfred C Body*
ATTORNEY United States Patent Office 3,084,323
Patented Apr. 2, 1963

3,084,323
FURNACE CONTROL CIRCUIT
Richard A. Sommer, Cleveland, Richard F. Seyfried, Parma Heights, and Robert J. Kasper, Lakewood, Ohio, assignors to Ohio Crankshaft Company, Cleveland, Ohio, a corporation of Ohio
Filed Mar. 7, 1961, Ser. No. 93,968
8 Claims. (322—20)

This invention relates to high frequency induction melting furnaces, and more particularly to an improved control circuit for furnaces of this type.

The control circuits for high frequency induction melting furnaces usually comprise a power source such as a motor-generator set, main line contacts for selectively connecting the generator to the induction coil of the furnace, a plurality of power factor correcting capacitors, and means for varying the number of capacitors in the circuit to vary the power factor as determined by the load on the furnace. In the operation of a high frequency induction melting furnace, there is a tendency for an operator to hastily add power factor correcting capacitors without reducing the field excitation of the motor-generator set, resulting in an excessive output current flow from the motor-generator and subsequent opening of the overload devices.

It has been previously suggested in a furnace control circuit of this type to employ some means of interlocking the capacitor adding feature with the main line circuit from the motor-generator to the furnace inductor, such that the main line contacts must be open before capacitance can be varied. One difficulty with such a system, however, is that the main line contacts may be closed after varying the power factor correcting capacitors without first reducing field current at the motor-generator with the result that the overload devices will trip out once the main line contacts are again closed.

The present invention contemplates and has as an overall object, the provision of a new and improved control circuit for high frequency induction melting furnaces which overcomes the above and other disadvantages of previous control circuits.

In accordance with the invention, closing of the main line contacts without first reducing the field current of the motor-generator is prevented by providing a limit switch on the power control for the motor-generator field circuit, the arrangement being such that this switch is closed only when the power control is in position to reduce the field current below a predetermined minimum. This limit switch is in the circuit controlling the actuating device for the main line contacts, such that they can be closed to apply power to the induction coil of the furnace only when the field current is reduced to such minimum.

Further in accordance with the invention, the power factor capacitors for the circuit are switched in and out of the circuit by remotely controlled switches, and the arrangement is such that the act of switching capacitors also opens the main line contacts.

Further in accordance with the invention, the capacitors are supplied in progressive two times multiples of the minimum capacitor such that the maximum variation of capacity range can be obtained with a minimum number of capacitors and switches therefor.

Another object of the invention is to provide an improved circuit of the type described above which is adapted to prevent closing of the main line contacts without first reducing field current at the motor-generator, thereby preventing tripping of the overload devices once the furnace inductor is again energized.

Still another object of the invention is to provide a relatively simple and economical means for accomplishing the foregoing objects.

The above and other objects and features of the invention will become apparent from the following detailed description taken in connection with the accompanying single figure drawing which comprises a schematic circuit diagram of the invention.

Referring now to the drawing which is for the purpose of illustrating an embodiment of the invention and not for the purpose of limiting the same, a motor 10 is connected through a mechanical linkage 12 to a high frequency generator 14 provided with a field control winding 16 and an output winding 18. As shown, output winding 18 is connected through main line contacts 20 and 22 to the induction coil for a melting furnace, schematically illustrated at 24. Connected in parallel between the opposite terminals of induction coil 24 are a plurality of power factor correcting capacitors 26, 28 and 30, having capacities of respectively $x$, $2x$ and $4x$ such that by properly placing such capacitors in the circuit to obtain, by using only 3 capacitors, a capacity range of $x$, $2x$, $3x$, $4x$, $5x$, $6x$, and $7x$. By using an additional capacitor having a capacity of $8x$ this range may be extended consecutively to $15x$ and so on in geometric progression. Connected in series with capacitor 26 are the contacts 32 of a relay 34. Similarly, capacitor 28 is connected in series with the contacts 36 of a relay 38, and capacitor 30 is connected in series with the contacts 40 of a relay 42. As will be seen, an appropriate number of the capacitors may be connected into the circuit by energizing a corresponding number of the relays 34, 38, 42, and so on.

Connected in series across a pair of terminals 44 and 46 are a field switch 48 and a variable auto transformer, generally indicated at 50. The terminals 44 and 46 are connected to a source of alternating current voltage, not shown, while the junction between variable auto transformer 50 and switch 48 is connected to one input terminal of a full-wave rectifier 52. The other input terminal of rectifier 52 is connected to a movable tap 54 on the variable auto transformer 50. The output terminals of rectifier 52 are connected through switch 53 to the field control winding 16 of high frequency generator 14, the arrangement being such that the field current at the generator may be varied by varying the position of the movable tap 54 on variable auto transformer 50. When the movable tap 54 is moved to its extreme left position as shown in the drawing, the field current and, hence, the output of generator 14 will be at a minimum. At this point, the movable tap 54 will actuate limit switch 56 to close its normally open contacts 58.

Relays 34, 38 and 42 are energized through contacts, three respectively, on an eight position rotary tap, switches 60, 62 and 64 enclosed by broken lines and generally indicated at 66. Although the rotary tap switches may take various forms, in the embodiment shown herein, it includes a rotatable shaft 68 which is fixedly secured to a contactor 70, the arrangement being such that when the shaft 68 is pulled upwardly as shown in the drawing, the contactor 70 will close. Upon downward movement of the shaft 68, it will slide through an aperture provided in a second contactor 72. However, when the shaft 68 is moved downwardly beyond the position shown in the drawing, an enlarged diameter portion or collar 74 will engage the contactor 72 to break the circuit made by that contactor. When the shaft is again pulled upwardly, the friction existing between shaft 68 and contactor 72 will cause it to move upwardly also. Thus, as shaft 68 is pulled upwardly, both of the contactors 70 and 72 will be closed. When shaft 68 is moved downwardly, however, contactor 70 will first open while contactor 72 remains closed until the collar 74 engages this contactor to move it downwardly also. The shaft 68 is connected through a mechanical linkage 76 to the selector arm on each of the contactors 60, 62 and 64, the arrangement being such that as the shaft is rotated, the contactors 60, 62 and 64 will each contact their associated circuits in succession.

The eight contacts on contactor 60 are arranged so that contacts 2, 4, 6, 8 connect to coil 34; the eight contacts on contactor 62 are arranged so that contacts 3, 4, 7, 8 connect to coil 38; and the eight contacts on contactor 64 are arranged so that contacts 5, 6, 7, 8 connect to coil 42. With this arrangement, the proper capacitors may be selected such that the total capacity selected increases progressively with a clockwise rotation of the selector arms.

When contactor 72 is closed, it is adapted to complete a circuit through the energizing coil 78 for the main line contacts 20 and 22 through normally open contacts 80 on the coil 78 and the normally closed contacts 82 of an overload relay 84. Relay 84, in turn, is energized through a coil 86 wound around one of the output leads from winding 18 on generator 14 whereby the relay 84 will be energized to open contacts 82 when an overload condition exists at the output of the generator. The energizing coil 78 can also be energized through a circuit including normally open contacts 58 of limit switch 56, the normally closed contacts 88 on coil 78 and contactor 70 on the rotary tap switch 66.

Operation of the system is as follows: with the shaft 68 of switch 66 in the position shown, it may be rotated to selectively close any contacts of the contactors 60, 62 and 64 to thereby energize the respective coils 34, 38 and 42 and close their associated contacts 32, 36 and 40 to insert appropriate power factor correcting capacitors in the power circuit to the induction coil 24. After the proper number of capacitors are inserted into the circuit in this manner, the shaft 68 is pulled upwardly to close contactor 70. Assuming that movable tap 54 on variable auto transformer 50 has now been moved to its extreme left position, the limit switch 56 will be tripped to close contacts 58. Thus, a circuit is now completed to coil 78 through contactor 72, contactor 70, and contacts 58, 88, 82. Coil 78 will now become energized to close main line contacts 20 and 22, open contacts 88, and close contacts 80. A holding circuit is now provided for coil 78 through contactor 72, contacts 80 and contacts 82. The induction coil 24 for the furnace is now energized and the output power from generator 14 may be increased by moving the movable tap 54 on variable auto transformer 50 to the right as shown in the drawing.

After a heating cycle is completed and it is desired to deenergize the coil 24, the shaft 68 on switch 66 must be moved downwardly by a sufficient amount whereby the collar 74 will move contactor 72 downwardly also to break the circuit to coil 78 and open contacts 20 and 22. Of course, if an overload condition occurs during the time that contactor 72 is closed, the coil 84 will be energized to open contacts 82 and break the circuit to coil 78 whereby the main line contacts 20 and 22 will also open.

In order to again energize the coil 24, the shaft 68 on switch 66 must be pulled upwardly to close contactor 70. If, however, the movable tap 54 on variable auto transformer 50 is not moved to its extreme left position where the field current is at a minimum, the limit switch 56 will not be tripped to close its contacts 58 whereby coil 78 may become energized. Thus, in order to again energize coil 24, the variable auto transformer must be adjusted such that a minimum field current condition exists in winding 16, thereby eliminating the possibility of an overload condition when capacitors are added to or subtracted from the circuit.

Although the invention has been shown in connection with a certain specific embodiment, it will be readily apparent to those skilled in the art that various changes in form and arrangement of parts may be made to suit requirements without departing from the spirit and scope of the invention.

Having thus described our invention, we claim:

1. In a power circuit for an induction coil including a generator, a device for controlling the output of said generator, electrically actuable switch means for connecting the generator to the coil, and means for selectively adding or subtracting power factor correcting capacitors to the circuit; the improvement of means for preventing actuation of the switch means to connect the generator to the coil except when the output of the generator is at a minimum comprising a normally open circuit for energizing said switch means, and a limit switch in said energizing circuit and actuable by said controlling device when it is in position to reduce the output of the generator to a minimum for closing said last-mentioned circuit to energize the switch means and connect the generator to the coil.

2. In a power circuit for an induction coil including a generator, a device for controlling the output of said generator, electrically actuated main line switch means for connecting the generator to the coil, and means for selectively adding or subtracting power factor correcting capacitors to the circuit; the improvement of means for preventing actuation of the main line switch means to connect the generator to the coil except when the output of the generator is at a minimum comprising a normally open circuit for energizing said main line switch means, limit switch means in said energizing circuit and actuable by said controlling device when it is in position to reduce the output of the generator to a minimum for closing said last-mentioned circuit to energize the main line switch means and connect the generator to the coil, and a holding circuit adapted to hold the main line switch means closed after it is initially energized by closure of said limit switch means.

3. In a power circuit for an induction coil including a generator, a device for controlling the output of said generator, electrically actuated main line switch means for connecting the generator to the coil, and means for selectively adding or subtracting power factor correcting capacitors to the circuit; the improvement of means for preventing actuation of the main line switch means to connect the generator to the coil except when the output of the generator is at a minimum comprising a normally open circuit for energizing said line switch means, limit switch means in said energizing circuit and actuable by said controlling device when it is in position to reduce the output of the generator to a minimum for closing said last-mentioned circuit to energize the main line switch means and connect the generator to the coil, a holding circuit adapted to hold the main line switch means closed after it is initially energized by closure of said limit switch means, and a switch device in said holding circuit for breaking the holding circuit to de-energize the main line switch means when it is desired to de-energize the coil.

4. A power circuit for an induction coil comprising a generator having a field control winding and an output winding, solenoid-operated main line switch means adapted to connect said output winding to the induction coil, means for selectively adding or subtracting power factor correcting capacitors to said power circuit, means including an adjutable voltage transformer element having a movable tap thereon for controlling the current in said field winding, a normally open limit switch arranged to be closed by said movable tap when it is in position to reduce the current in the field winding to a minimum, and circuit means including a manually operated switch and said limit switch for energizing the solenoid of said main line switch means to close the same, the arrangement being such that the solenoid will become energized only when the manually operated switch is closed and said movable tap is in position to close said limit switch.

5. A power circuit for an induction coil comprising a generator having a field control winding and an output winding, solenoid-operated main line switch means adapted to connect said output winding to the induction coil, means for selectively adding or subtracting power factor correcting capacitors to said power circuit, means including an adjustable voltage transformer element having a movable tap thereon for controlling the current in said field winding, a normally open limit switch arranged to be closed by said movable tap when it is in position to reduce the current in said field winding to a minimum, circuit means including a manually operated switch and said limit switch for energizing the solenoid of said main line switch means to close the same only when the manually operated switch is closed and said movable tap is in position to close said limit switch, and a holding circuit for said solenoid, said holding circuit including contacts on said manually operated switch which may be selectively opened to deenergize said solenoid and open the main line switch means to deenergize the aforementioned induction coil.

6. A power circuit for an induction coil comprising a generator having a field control winding and an output winding, solenoid-operated main line switch means adapted to connect said output winding to the induction coil, means for selectively adding or subtracting power factor correcting capacitors to said power circuit, means including a variable auto transformer for controlling the current in said field winding, means for applying a source of alternating current voltage across the opposite input terminals of said variable transformer, a movable tap on said variable transformer, a rectifying device having input terminals and output terminals, a connection between one of the input terminals of said rectifying device and said movable tap, a connection between the other of said input terminals of the rectifying device and one of the input terminals of said variable transformer, means connecting the output terminals of said rectifying device to said field control winding, a normally open limit switch arranged to be closed by said movable tap when it is in position to reduce the current in said field winding to a minimum, and circuit means including a manually operated switch and said limit switch for energizing the solenoid of said main line switch means to close the same, the arrangement being such that the solenoid will become energized only when the manually operated switch is closed and said movable tap is in position to close said limit switch.

7. A power circuit for an induction coil comprising a generator having a field control winding and an output winding, solenoid-operated main line switch means adapted to connect said output winding to the induction coil, means for selectively adding or subtracting power factor correcting capacitors to said power circuit, means including an adjustable voltage transformer element having a movable tap thereon for controlling the current in said field winding, a normally open limit switch arranged to be closed by said movable tap when it is in position to reduce the current in the field winding to a minimum, a manually operated switch having a shaft movable along a path defined by the longitudinal axis of said shaft, a first contactor on the shaft, first normally open contacts adapted to be closed by said first contactor when said shaft is moved in one direction, a second contactor on the shaft, second normally closed contacts adapted to be opened when the shaft is moved in the other direction, circuit means including said first contacts and said limit switch for energizing the solenoid of said main line switch means to close the same only when the first contacts are closed and said movable tap is in position to close said limit switch, and a holding circuit for the solenoid including said second normally closed contacts on the manually operated switch.

8. A power circuit for an induction coil comprising a generator having a field control winding and an output winding, solenoid-operated main line switch means adapted to connect said output winding to the induction coil, relay means for selectively adding or subtracting power factor correcting capacitors to said power circuit, means including an impedance element having a movable tap thereon for controlling the current in said field winding, a normally open limit switch arranged to be closed by said movable tap when it is in position to reduce the current in the field winding to a minimum, a manually operated switch having a rotatable shaft movable along a path defined by the longitudinal axis of the shaft, a first contactor fastened on the shaft, first normally open contacts adapted to be closed by said first contactor when the shaft is moved in one direction, a second contactor on the shaft, second normally closed contacts adapted to be opened when the shaft is moved in the other direction, circuit means including said first contacts and said limit switch for energizing the solenoid of said main line switch means to close the same only when said first contacts are closed and said movable tap is in position to close said limit switch, a holding circuit for said solenoid including the second contacts on said manually operated switch, and a plurality of contacts on said manually operated switch adapted to be closed to energize selective ones of said relays upon rotation of the shaft of said manually operated switch.

References Cited in the file of this patent

UNITED STATES PATENTS

| | | |
|---|---|---|
| 2,231,727 | Longwell | Feb. 11, 1941 |
| 2,676,235 | Kennedy et al. | Apr. 20, 1954 |